Feb. 16, 1926.

J. NEY

ANIMAL TRAP

Filed May 11, 1925

1,573,185

Inventor
Jacob Ney

Patented Feb. 16, 1926.

1,573,185

UNITED STATES PATENT OFFICE.

JACOB NEY, OF CANTON, OHIO.

ANIMAL TRAP.

Application filed May 11, 1925. Serial No. 29,469.

*To all whom it may concern:*

Be it known that I, JACOB NEY, a citizen of the United States, residing at Canton, in the county of Stark and State of Ohio, have invented certain new and useful Improvements in Animal Traps, of which the following is a specification.

This invention relates to traps for entrapping rats and other animals, and more particularly to a cage type of trap.

The objects of the improvement are to provide a trap so constructed that it is not necessary for the animal to enter the trap or touch the bait in order to spring the trap, means being provided for impelling the animal into the trap and instantly closing the same when the animal approaches the bait.

The above and other objects may be attained by providing a spring impelled platform having a pivoted trigger strip thereon arranged to automatically release the platform and instantly close the same, throwing the animal into the cage, when the animal touches the trigger strip, means being provided, if desired, to suspend a bait at a point near the trigger strip to attract the attention of the animal and cause him to step upon the trigger strip or come in contact with the same.

Figure 1:
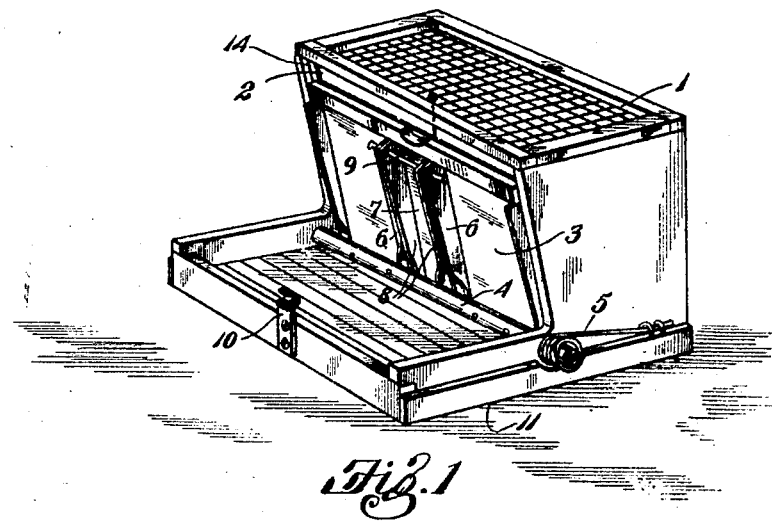
Figure 2:
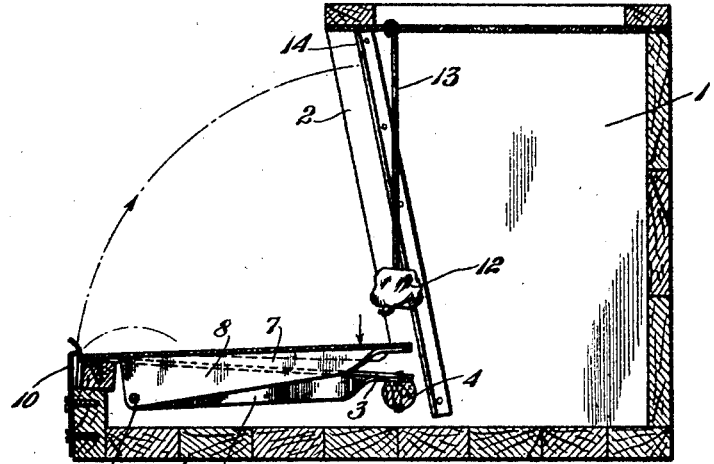

An embodiment of the invention is illustrated in the accompanying drawing, in which, Figure 1 is a perspective view of a trap embodying the invention showing the same in the closed position, and Fig. 2, a transverse sectional view through the trap showing the same in set position.

Similar numerals of reference indicate corresponding parts through the drawing.

The trap comprises the cage portion 1 which may be constructed of any suitable material, and provided with the open side 2 arranged to be closed by the platform 3 which is mounted upon the rod 4 journaled in the sidewalls of the cage, the ends of said rod extending through the sidewalls and being associated with the springs 5 arranged to normally hold the platform in closed position, as illustrated in Fig. 1.

The platform 3 is provided with a central slot having the depending flanges 6 at its edges, and the pivoted trigger strip 7 is mounted in said slot, being provided with depending flanges 8 for pivotal connection to the flanges 6, near the free edge portion of the platform, as indicated at 9.

A spring catch 10 is provided at the outer edge of the elongated bottom member 11, of the cage, and arranged to engage the outer end portion of the trigger strip 7, to hold the platform in the open or set position, as shown in Fig. 2, the inner end of the trigger strip being raised considerably above the level of the platform as shown.

If desired, bait as indicated at 12, may be located adjacent to the inner raised end of the trigger strip in any suitable manner, as by suspending the same above the platform upon a rod or wire 13 connected to the top of the cage.

It will be seen that as an animal steps upon the trigger strip 7 the same will be depressed, releasing the outer end thereof from the spring catch 10, permitting the springs 5 to suddenly and sharply close the platform against the cage, closing the entrance to the cage and precipitating the animal inside of the cage. The springs 5 are sufficiently strong to hold the platform tightly against the stop strips 14 at the entrance to the cage thus preventing escape of the animal from the trap.

From the above it will be obvious that a quick acting and reliable trap is provided which will entrap any animal attracted by the bait, instantly propelling the animal into the cage and closing the same when the trigger strip is depressed, thus making it unnecessary for the animal to actually enter the cage or touch the bait.

I claim:

1. A trap including a cage open at one side, a platform pivotally attached at the open side of the cage, means for normally urging the platform toward the open side of the cage, a pivoted portion of the platform and a releasable catch arranged to engage the outer end of said pivoted portion of the platform to hold the platform in open position.

2. A trap including a cage having an open side, a platform pivoted at the open side of the cage, means for holding the platform in open or set position, and means operated by pressure on a portion of the platform for suddenly closing the platform against the open side of the cage and precipitating an occupant of the platform into the cage.

3. A trap including a cage having an open side, a platform pivoted near the bottom of said open side of the cage, springs operatively connected to the platform for normally urging the same toward the open side of the cage, a trigger strip pivotally mounted intermediate its extremities, upon the platform, and a spring catch arranged to engage the outer end of the trigger strip to depress the same and raise the forward end of the trigger strip and hold the platform in open position whereby pressure upon the trigger strip, forward of the pivotal point, will release the same from the spring catch and permit the springs to suddenly close the platform against the open side of the cage.

In testimony that I claim the above, I have hereunto subscribed my name.

JACOB NEY.